United States Patent
Chiba (10) Patent No.: US 12,084,124 B2
(45) Date of Patent: Sep. 10, 2024

(54) ELECTRIC POWER STEERING APPARATUS

(71) Applicant: KYB Corporation, Tokyo (JP)

(72) Inventor: Shuhei Chiba, Gifu (JP)

(73) Assignee: KYB CORPORATION, Tokyo (JP)

( * ) Notice: Subject to any disclaimer, the term of this patent is extended or adjusted under 35 U.S.C. 154(b) by 603 days.

(21) Appl. No.: 17/421,328

(22) PCT Filed: Nov. 22, 2019

(86) PCT No.: PCT/JP2019/045868
§ 371 (c)(1),
(2) Date: Jul. 7, 2021

(87) PCT Pub. No.: WO2020/149012
PCT Pub. Date: Jul. 23, 2020

(65) Prior Publication Data
US 2022/0055683 A1    Feb. 24, 2022

(30) Foreign Application Priority Data

Jan. 15, 2019  (JP) .................................. 2019-004519

(51) Int. Cl.
*B62D 5/04*    (2006.01)
*B62K 5/01*    (2013.01)

(52) U.S. Cl.
CPC ........... *B62D 5/046* (2013.01); *B62D 5/0421* (2013.01); *B62K 5/01* (2013.01)

(58) Field of Classification Search
CPC .............................. B62D 5/046; B62D 5/0421
See application file for complete search history.

(56) References Cited

U.S. PATENT DOCUMENTS

| | | | |
|---|---|---|---|
| 5,836,419 A * | 11/1998 | Shimizu ................... | B62D 5/04 180/443 |
| 6,966,399 B2 * | 11/2005 | Tanigaki ............... | B62D 5/0421 180/908 |
| 2006/0185927 A1 * | 8/2006 | Sakamoto ................ | B62D 5/04 180/443 |
| 2008/0099263 A1 | 5/2008 | Takeshima et al. | |
| 2008/0257632 A1 | 10/2008 | Takeshima et al. | |
| 2010/0243367 A1 * | 9/2010 | Suzuki .................. | F16H 57/022 180/444 |

FOREIGN PATENT DOCUMENTS

| | | |
|---|---|---|
| JP | 2006-232059 A | 9/2006 |
| JP | 2006-256580 A | 9/2006 |
| JP | 2008-114617 A | 5/2008 |

(Continued)

*Primary Examiner* — Jacob D Knutson
(74) *Attorney, Agent, or Firm* — Rabin & Berdo, P.C.

(57) ABSTRACT

An electric power steering apparatus arranged in the vicinity of a heat source mounted on a vehicle includes: a rack shaft that turns a road wheel; an output shaft provided with a pinion gear engaged with a rack gear of the rack shaft; a worm wheel provided on the output shaft; a worm shaft engaged with the worm wheel; an electric motor that drives the worm shaft; and a controller that controls driving of the electric motor, and wherein at least a part of the controller is arranged on the opposite side of the heat source such that a rack housing is sandwiched between at least a part of the controller and the heat source, the rack housing accommodating the rack shaft.

3 Claims, 9 Drawing Sheets

(56) References Cited

FOREIGN PATENT DOCUMENTS

| JP | 2008-114620 | A |   | 5/2008  |           |
|----|-------------|---|---|---------|-----------|
| JP | 2008-201236 | A |   | 9/2008  |           |
| JP | 2014-189174 | A |   | 10/2014 |           |
| JP | 2019104439  | A | * | 6/2019  |           |
| WO | WO-2017145599 | A1 | * | 8/2017 | ........... B62D 5/0406 |

\* cited by examiner

ELECTRIC POWER STEERING APPARATUS

TECHNICAL FIELD

The present invention relates to an electric power steering apparatus.

BACKGROUND ART

JP2006-232059A discloses an electric power steering apparatus that is assembled to an all terrain vehicle (ATV) having a relatively narrow vehicle width.

SUMMARY OF INVENTION

The electric power steering apparatus described in JP2006-232059A is arranged at the rear side of a radiator in the front-rear direction of the vehicle. Therefore, the electric power steering apparatus is unavoidably heated by heat released by the radiator. Because the electric power steering apparatus has a controller for driving a motor, when the controller is heated by the heat released by the radiator, the output by the motor is restricted, and as a result, there is a risk in that the operation of the electric power steering apparatus becomes unstable.

An object of the present invention is to achieve a stable operation of an electric power steering apparatus.

According to one aspect of the present invention, an electric power steering apparatus arranged in a vicinity of a heat source mounted on a vehicle, the electric power steering apparatus includes: a rack shaft configured to turn a road wheel; a pinion shaft provided with a pinion gear configured to be engaged with a rack gear of the rack shaft; a worm wheel provided on the pinion shaft; a worm shaft configured to be engaged with the worm wheel; an electric motor configured to rotationally drive the worm shaft; and a control unit configured to control driving of the electric motor, wherein at least a part of the control unit is arranged on an opposite side from the heat source such that a rack housing is sandwiched between at least the part of the control unit and the heat source, the rack housing being configured to accommodate the rack shaft.

DESCRIPTION OF EMBODIMENTS

Embodiments of the present invention will be described below with reference to the drawings.

First Embodiment

An electric power steering apparatus 100 according to a first embodiment of the present invention will be described with reference to FIGS. 1 to 3. The electric power steering apparatus 100 is an apparatus that is mounted on a vehicle and that supplies a steering force to assist the steering apparatus for turning road wheels 1 by converting a steering torque applied to a steering wheel 10 by a driver.

In the following, a case in which the vehicle to which the electric power steering apparatus 100 is to be assembled is an all terrain vehicle (ATV) and a side by side vehicle (SSV) having a relatively small vehicle width will be described. FIG. 1 is a configuration diagram of the electric power steering apparatus 100, FIG. 2 is a diagram of the electric power steering apparatus 100 assembled to the vehicle, viewed from the side of the vehicle, and FIG. 3 is a diagram of the electric power steering apparatus 100, viewed from the top of the vehicle.

Figure 1:
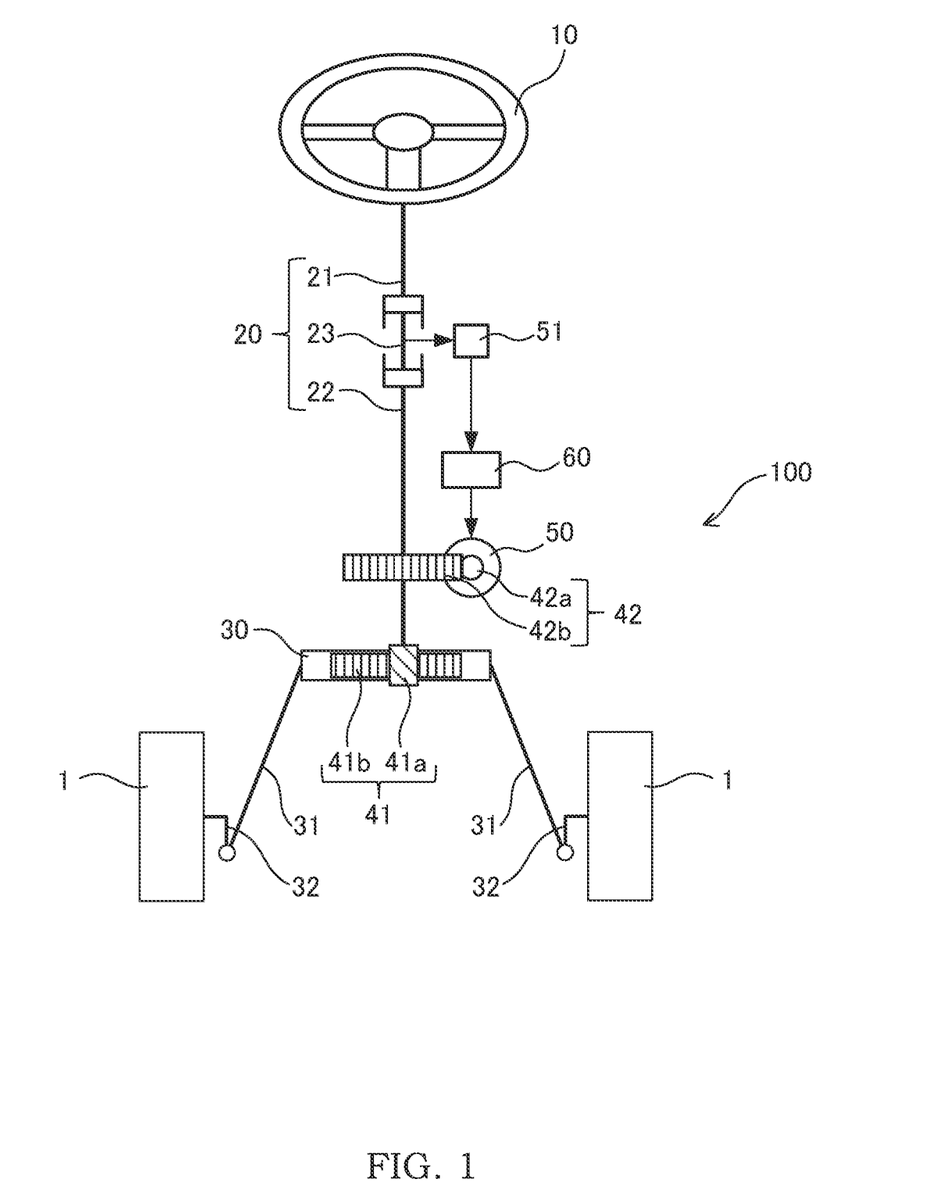
FIG. 1 is a configuration diagram of an electric power steering apparatus according to a first embodiment of the present invention.

As shown in FIG. 1, the electric power steering apparatus 100 is provided with a steering shaft 20 that is linked to the steering wheel 10 and a rack shaft 30 that turns the road wheels 1 by rotation of the steering shaft 20. The rack shaft 30 is linked to the road wheels 1 via tie rods 31 and steering knuckle arms 32, and the road wheels 1 are turned by displacement of the rack shaft 30.

The steering shaft 20 is formed of: an input shaft 21 that is rotated along with a steering operation performed by the driver operating the steering wheel 10; an output shaft 22 serving as a pinion shaft that displaces the rack shaft 30; and a torsion bar 23 that links the input shaft 21 and the output shaft 22.

The output shaft 22 and the rack shaft 30 are linked with each other via a first transmitting unit 41. The first transmitting unit 41 is formed of a pinion gear 41a that is provided on an end portion of the output shaft 22 and a rack gear 41b that is provided on the rack shaft 30. The pinion gear 41a and the rack gear 41b are engaged with each other, and the torque from the output shaft 22 is transmitted to the rack shaft 30 by being converted to a load in the shaft direction of the rack shaft 30 via the pinion gear 41a and the rack gear 41b. With such a configuration, the rack shaft 30 is displaced by the thus-transmitted torque in its shaft direction, thereby causing the road wheels 1 to be turned.

In addition, the electric power steering apparatus 100 is further provided with an electric motor 50 that is driven in response to the steering operation, a torque sensor 51 that detects the torque applied to the torsion bar 23, and a controller 60 that controls the driving of the electric motor 50 in response to the detected value by the torque sensor 51.

An output shaft of the electric motor 50 is linked to the output shaft 22 of the steering shaft 20 via a second transmitting unit 42.

The second transmitting unit 42 is formed of a worm shaft 42a that is provided on the output shaft of the electric motor 50 and a worm wheel 42b that is provided on the output shaft 22. The worm shaft 42a and the worm wheel 42b are engaged with each other, and the torque from the electric motor 50 is transmitted to the output shaft 22 via the worm shaft 42a and the worm wheel 42b. The torque that has transmitted from the electric motor 50 to the output shaft 22 is further transmitted to the rack shaft 30 via the pinion gear 41a and the rack gear 41b.

The controller 60 is formed of a microcomputer including a CPU (Central Processing Unit) that carries out a computational processing, a ROM (Read-Only Memory) that stores a control program, etc. to be executed by the CPU, and a RAM (random access memory) that stores computed results, etc. from the CPU. The controller 60 may be formed of a single microcomputer or of a plurality of microcomputers. The controller 60 is provided so as to be adjacent to the electric motor 50, and for example, as shown in FIGS. 2 and 3, the controller 60 is provided on the opposite side from the worm shaft 42a such that the electric motor 50 is sandwiched between the controller 60 and the worm shaft 42a.

Figure 2:
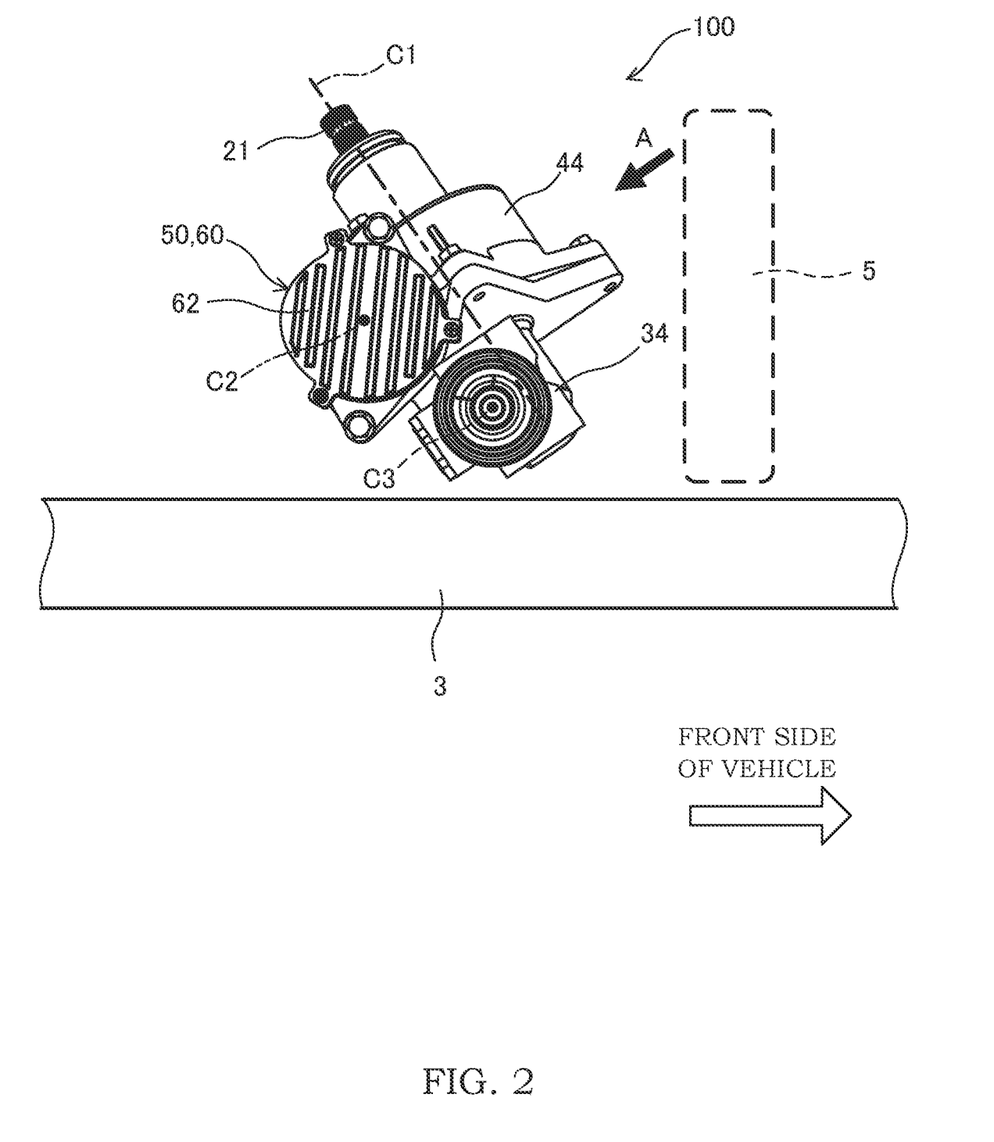
FIG. 2 is a diagram showing a state in which the electric power steering apparatus according to the first embodiment of the present invention is assembled to a vehicle, viewed from the side of the vehicle.
Figure 3:
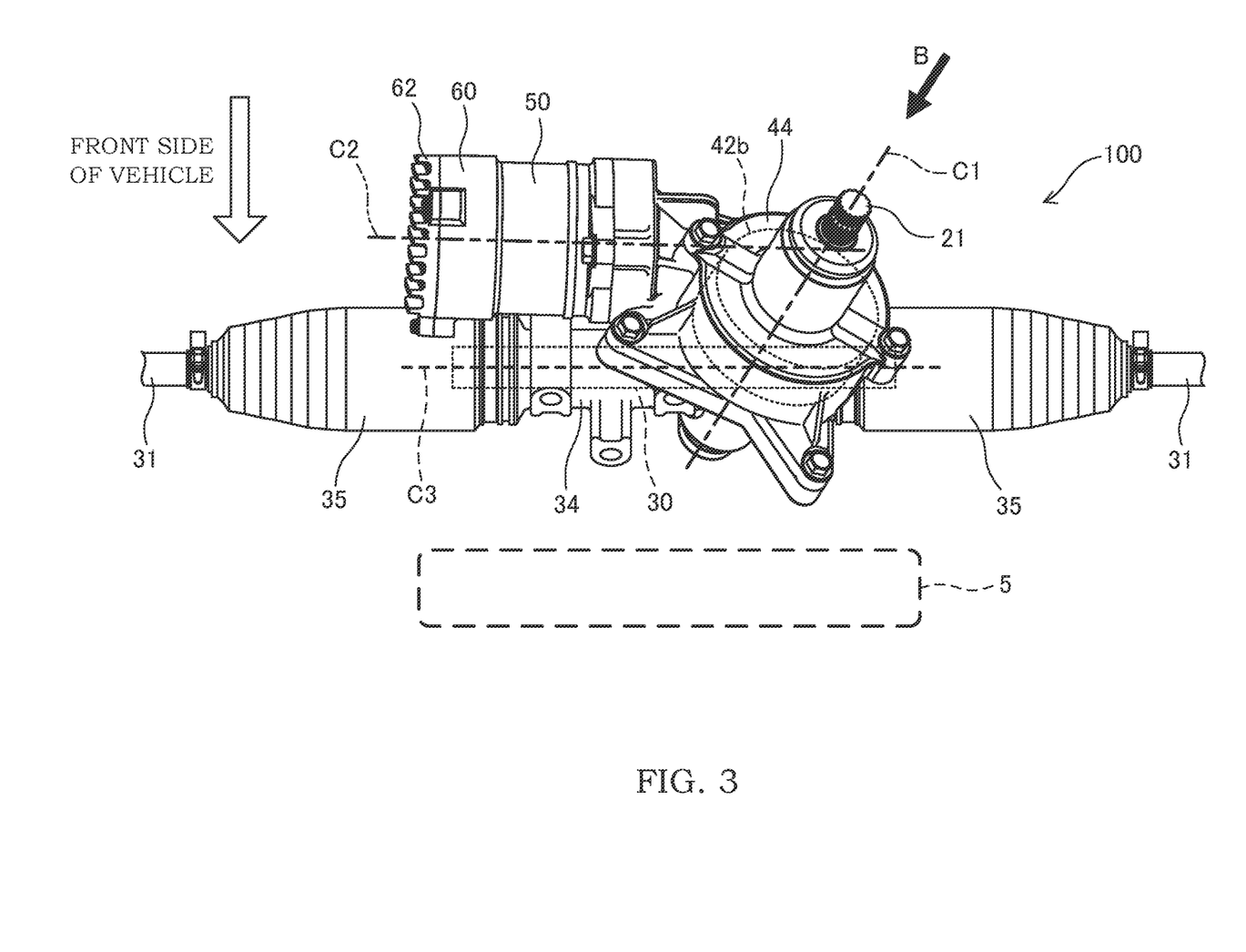
FIG. 3 is a diagram showing a state in which the electric power steering apparatus according to the first embodiment of the present invention is assembled to the vehicle, viewed from the top of vehicle.

In addition, as shown in FIGS. 2 and 3, a heat sink 62 for releasing internal heat is provided on the other side of the controller 60 with respect to the electric motor 50. In order to efficiently releasing heat generated by elements in the controller 60 to the outside, the heat sink 62 is formed of a metal material, such as aluminum, etc., having an excellent heat conductivity so as to have a shape with fins and cavities. As described above, by providing the heat sink 62 on the controller 60, a temperature rise in the controller 60 is suppressed, and therefore, it is possible to drive the electric motor 50 stably.

The torque sensor 51 detects the steering torque imparted to the input shaft 21 along with the steering operation performed by the driver and outputs a voltage signal corresponding to thus-detected steering torque to the controller 60. The controller 60 computes a torque to be output from the electric motor 50 on the basis of the voltage signal from the torque sensor 51 and controls the driving of the electric motor 50 such that the torque is generated accordingly.

As described above, with the electric power steering apparatus 100, the steering torque imparted to the input shaft 21 is detected by the torque sensor 51 and the driving of the electric motor 50 is controlled by the controller 60 in accordance with the detected results, and thereby, the steering operation performed by the driver is assisted.

In addition, as shown in FIGS. 2 and 3, the electric power steering apparatus 100 is further provided with a rack housing 34 that accommodates the rack shaft 30 and a worm housing 44 that accommodates the worm wheel 42b. The electric power steering apparatus 100 is attached to a vehicle frame 3 by fixing the rack housing 34 to a bracket (not shown) extending from the vehicle frame 3.

The pinion gear 41a that is provided on the output shaft 22 is further accommodated in the rack housing 34. In addition, boots 35 for covering linking portions between the rack shaft 30 and the tie rods 31 are assembled to the rack housing 34.

The output shaft 22 on which the worm wheel 42b is provided and the worm shaft 42a that engages with the worm wheel 42b are further accommodated in the worm housing 44. In addition, the electric motor 50 that drives the worm shaft 42a is assembled to the worm housing 44.

In addition, as shown in FIGS. 2 and 3, in a state in which the electric power steering apparatus 100 is assembled to the vehicle, the worm housing 44 is arranged on the upper side of the rack housing 34 in the vertical direction. As described above, because the worm housing 44 is arranged on the upper side of the rack housing 34 in the vertical direction, even in a case in which the vehicle, like the all terrain vehicle, travels through rivers, etc. with a certain water depth, in contrast to a case in which the worm housing 44 is arranged on the lower side of the rack housing 34 in the vertical direction, it is possible to prevent entry of water into the worm housing 44, and at the same time, it is possible to prevent entry of water into the electric motor 50 assembled to the worm housing 44.

In the above, because a space for arranging apparatuses forming the vehicle is limited in the vehicle with a relatively small vehicle width as in the all terrain vehicle, as shown in FIG. 2, a radiator 5 that cools a coolant for an engine (not shown) is arranged in the vicinity of the electric power steering apparatus 100, for example. As described above, in a case in which the radiator 5 serving as a heat source is arranged on the front side of the electric power steering apparatus 100, the electric power steering apparatus 100 is caused to be heated by the heat released from the radiator 5 when a radiator fan (not shown) is being rotated and when the vehicle is travelling.

Especially, the controller 60 of the electric power steering apparatus 100 executes restriction of functions, such as restriction of driving force from the electric motor 50 in order to protect a circuit when temperature is increased. Therefore, if the controller 60 is heated by the heat released from the radiator 5, the operation of the electric motor 50 is restricted, and as a result, it becomes difficult to operate the electric power steering apparatus 100 stably.

Thus, in the first embodiment, even in a case in which the heat source like the radiator 5 is arranged in the vicinity of the electric power steering apparatus 100, in order to prevent an increase in the temperature of the controller 60 by the heat released from the radiator 5, at least a part of the controller 60 is arranged on the opposite side from the radiator 5 serving as the heat source such that the rack housing 34 accommodating the rack shaft 30 is sandwiched between at least the part of the controller 60 and the radiator 5. In other words, when the electric power steering apparatus 100 is viewed in the horizontal direction from the radiator 5 side, at least the part of the controller 60 is overlapped with the rack housing 34, thereby making it partially invisible.

As described above, by arranging the rack housing 34 between the radiator 5 and the controller 60, the rack housing 34 functions as a heat shielding member that blocks the hot air from the radiator 5 and the radiator fan such that the hot air does not hit the controller 60 directly.

In addition, the heat sink 62 is also arranged on the opposite side from the radiator 5 such that the rack housing 34 is sandwiched between the heat sink 62 and the radiator 5 so that the heat released from the radiator 5 is not transferred to the inside of the controller 60 via the heat sink 62.

Also in this case, the rack housing 34 functions as the heat shielding member that blocks the hot air from the radiator 5 and the radiator fan such that the hot air does not hit the heat sink 62 directly.

As described above, by using the rack housing 34 as the heat shielding member, it is possible to suppress heating of the controller 60 and the heat sink 62 by the heat released from the radiator 5. Therefore, even in a case in which the heat source like the radiator 5 is arranged in the vicinity of the electric power steering apparatus 100, the increase in the temperature of the controller 60 by the radiant heat radiated from the heat source is suppressed, and as a result, it is possible to allow the electric power steering apparatus 100 to be operated consistently and stably.

Figure 4:
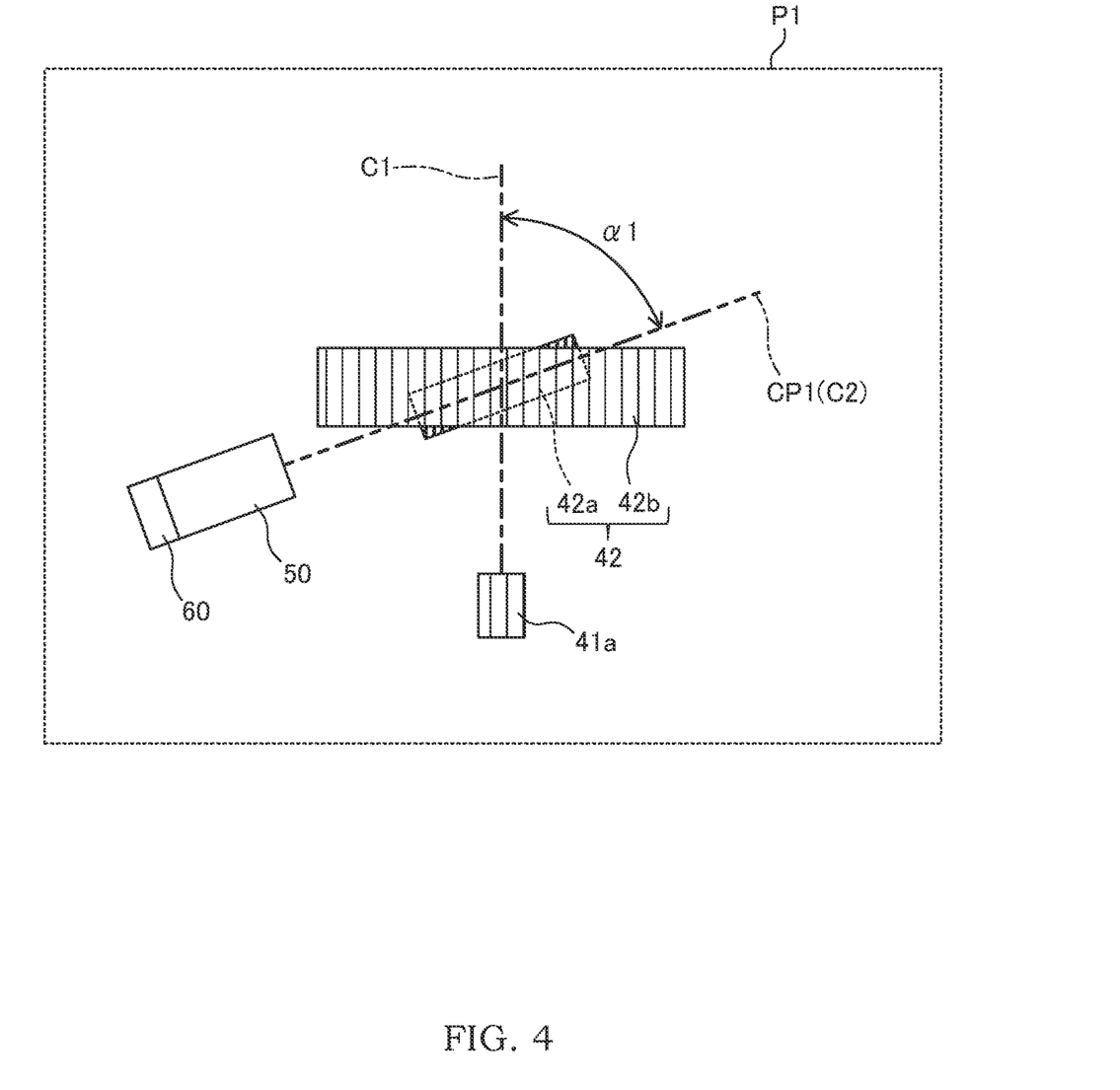
FIG. 4 is a schematic view showing the relationship between a first shaft center and a second shaft center that is projected on a first plane.

Next, a configuration that allows arrangement of the controller 60 and the heat sink 62 on the opposite side from the radiator 5 such that the rack housing 34 is sandwiched between the radiator 5 and the controller 60 and the heat sink 62 will be described with reference to FIGS. 2 to 5. FIG. 4 is a schematic view showing the relationship between the first shaft center C1 and the second shaft center C2 that is projected on a first plane P1 that includes a first shaft center C1 corresponding to the shaft center of the output shaft 22 and that is in parallel with a second shaft center C2 corresponding to the shaft center of the worm shaft 42a, viewed from the direction shown by an arrow A in FIG. 2, and FIG. 5 is a schematic view showing the relationship between the second shaft center C2 and a third shaft center C3 corresponding to the shaft center of the rack shaft 30 that is projected on a second plane P2 that is orthogonal with the first shaft center C1, viewed from the direction shown by an arrow B in FIG. 3.

As shown in FIG. 4, a predetermined first angle a1 is formed between the first shaft center C1 of the output shaft 22 and a first projected-shaft-center CP1 corresponding to the second shaft center C2 of the worm shaft 42a that is projected on the first plane P1.

Because the controller 60 is arranged together with the electric motor 50 on the second shaft center C2, if the first angle a1 is set so as to be smaller than 90 degrees, a state in which the controller 60 is positioned closer to the pinion gear 41a arranged on the first shaft center C1, in other words, a state in which the controller 60 is positioned closer to the rack housing 34 is achieved. On the other hand, if the first angle a1 is set so as to be larger than 90 degrees, a state in which the controller 60 is positioned farther away from the rack housing 34 is achieved. If the first angle a1 is set so as to be equal to 90 degrees, a state in which the output shaft 22 and the worm shaft 42a are positioned so as to be orthogonal with each other is achieved.

Figure 5:
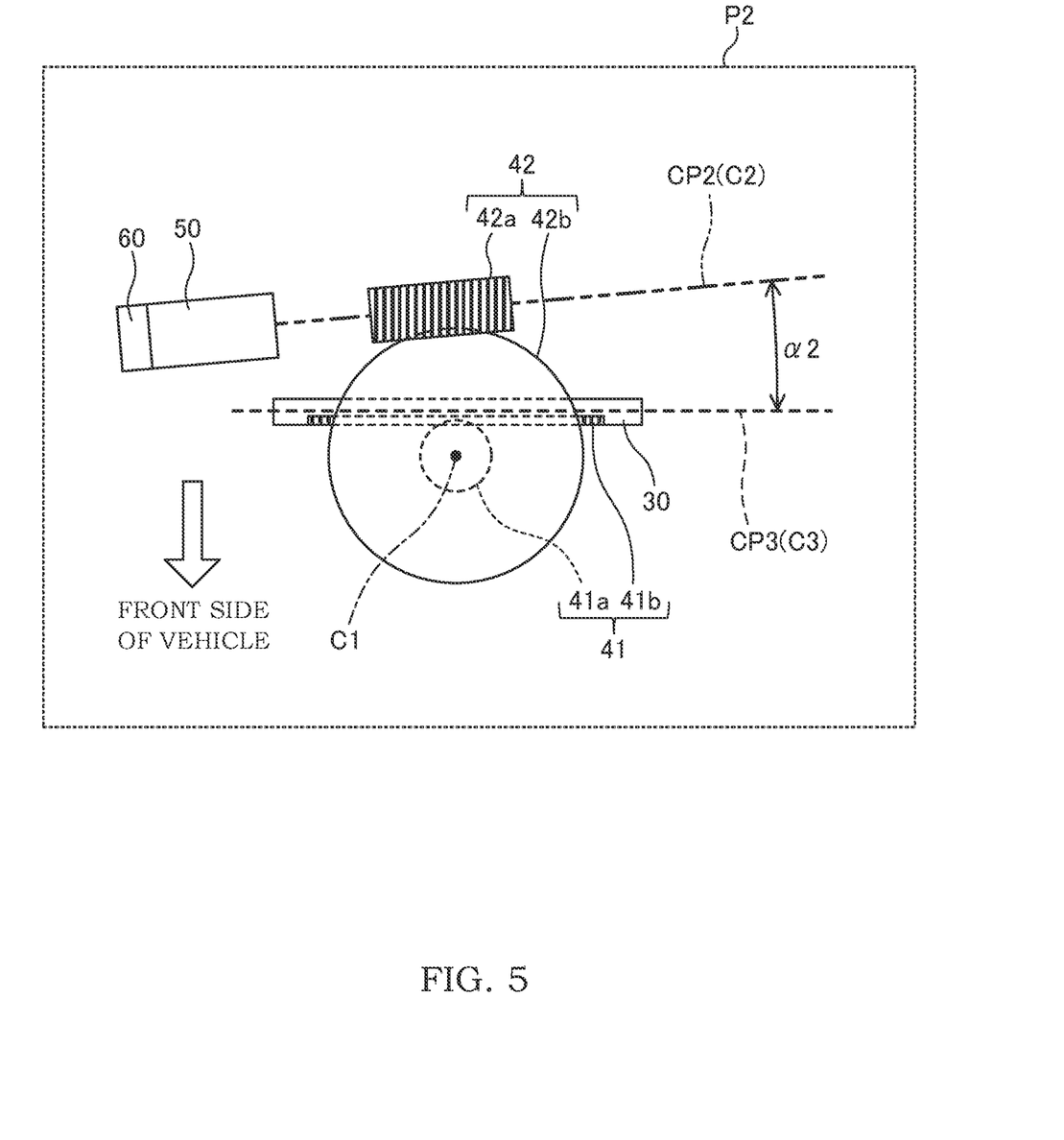
FIG. 5 is a schematic view showing the relationship between the second shaft center and a third shaft center that is projected on a second plane.

In addition, as shown in FIG. 5, a predetermined second angle a2 is formed between a second projected-shaft-center CP2 corresponding to the second shaft center C2 of the worm shaft 42a that is projected on the second plane P2 and a third projected-shaft-center CP3 corresponding to the third shaft center C3 of the rack shaft 30 that is projected on the second plane P2.

Because the controller 60 is arranged on the second shaft center C2, if the second angle a2 is set so as to be larger than 0 degree, a state in which the controller 60 is positioned closer to the rack shaft 30, in other words, a state in which the controller 60 is positioned closer to the rack housing 34 is achieved. On the other hand, if the second angle a2 is set so as to be smaller than 0 degree, a state in which the controller 60 is positioned farther away from the rack housing 34 is achieved. If the second angle a2 is set so as to be equal to 0 degree, the second projected-shaft-center CP2 and the third projected-shaft-center CP3 are positioned so as to be parallel with each other.

In the above, in order to achieve the configuration in which the hot air from the radiator 5 and the radiator fan does not hit the controller 60 and the heat sink 62 directly, it is preferable that the controller 60 and the heat sink 62 be arranged such that the controller 60 and the heat sink 62 are hidden behind the rack housing 34 as much as possible when viewed from the radiator 5 side.

In order to arrange the controller 60 and the heat sink 62 so as to be hidden behind the rack housing 34 when viewed from the radiator 5 side as described above, the controller 60 and the heat sink 62 are arranged on the opposite side from the radiator 5 such that the rack housing 34 is sandwiched between the radiator 5 and the controller 60 and the heat sink 62 by setting the second angle a2 so as to be equal to 0 degree or so as to be slightly smaller than 0 degree and by setting the first angle a1 so as to be smaller than 90 degrees.

If the first angle a1 is set so as to have a too small value, the controller 60 is arranged at a position lower than the rack housing 34 in the vertical direction, and therefore, depending on the position of the radiator 5, there is a risk in that the hot air from the radiator 5 may hit the controller 60 directly. Therefore, the size of the first angle a1 is set appropriately in accordance with the positional relationship between the radiator 5 and the rack housing 34.

As described above, by setting the sizes of the first angle a1 and the second angle a2, in other words, by setting the positional relationship between the output shaft 22, the worm shaft 42a, and the rack shaft 30 in accordance with the positional relationship between the radiator 5 and the rack housing 34, it is possible to block the hot air flowing from the radiator 5 towards the controller 60 and the heat sink 62 by the rack housing 34. Therefore, it is possible to suppress the increase in the temperature of the controller 60.

In addition, by utilizing the rack housing 34 as the heat shielding member, there is no need to separately provide the electric power steering apparatus 100 with a member for suppressing the flow of the hot air from the radiator 5 directly hitting the controller 60 and the heat sink 62. Thus, it is possible to suppress the increase in the temperature of the controller 60 without increasing a production cost for the electric power steering apparatus 100.

In addition, as shown in FIGS. 2 and 3, by setting the sizes of the first angle a1 and the second angle a2 such that the second shaft center C2 of the worm shaft 42a and the third shaft center C3 of the rack shaft 30 extend in parallel with each other, it is possible to make the electric power steering apparatus 100 compact. Therefore, even in a case in which other apparatuses are arranged in the vicinity of the electric power steering apparatus 100, it is possible to prevent the hot air from the radiator 5 from hitting the controller 60 and the heat sink 62 directly.

The controller 60 need not be arranged on the second shaft center C2 in a strict sense, and it suffices that the controller 60 is arranged such that the position of the controller 60 relative to the rack housing 34 is changed together with the electric motor 50 as the first angle a1 is changed. In addition, the first angle a1 is not limited to the angle at the position shown in FIG. 4, and the angle may be any of other angles at other positions as long as they are angles formed between the first shaft center C1 and the first projected-shaft-center CP1 on the first plane P1. Similarly, the second angle a2 is not limited to the angle at the position shown in FIG. 5, and the angle may be any of other angles at other positions as long as they are angles formed between the second projected-shaft-center CP2 and the third projected-shaft-center CP3 on the second plane P2.

According to the above-described first embodiment, the following effects are afforded.

In the electric power steering apparatus 100, at least the part of the controller 60 is arranged on the opposite side from the radiator 5 serving as the heat source such that the rack housing 34 accommodating the rack shaft 30 is sandwiched between at least the part of the controller 60 and the radiator 5. As described above, by utilizing the rack housing 34 as the heat shielding member, it is possible to suppress the heating of the controller 60 and the heat sink 62 by the heat released from the radiator 5. Therefore, even in a case in which the heat source like the radiator 5 is arranged in the vicinity of the electric power steering apparatus 100, the increase in the temperature of the controller 60 by the radiant heat radiated from the heat source is suppressed, and as a result, it is possible to allow the electric power steering apparatus 100 to be operated consistently and stably.

Second Embodiment

Figure 6:
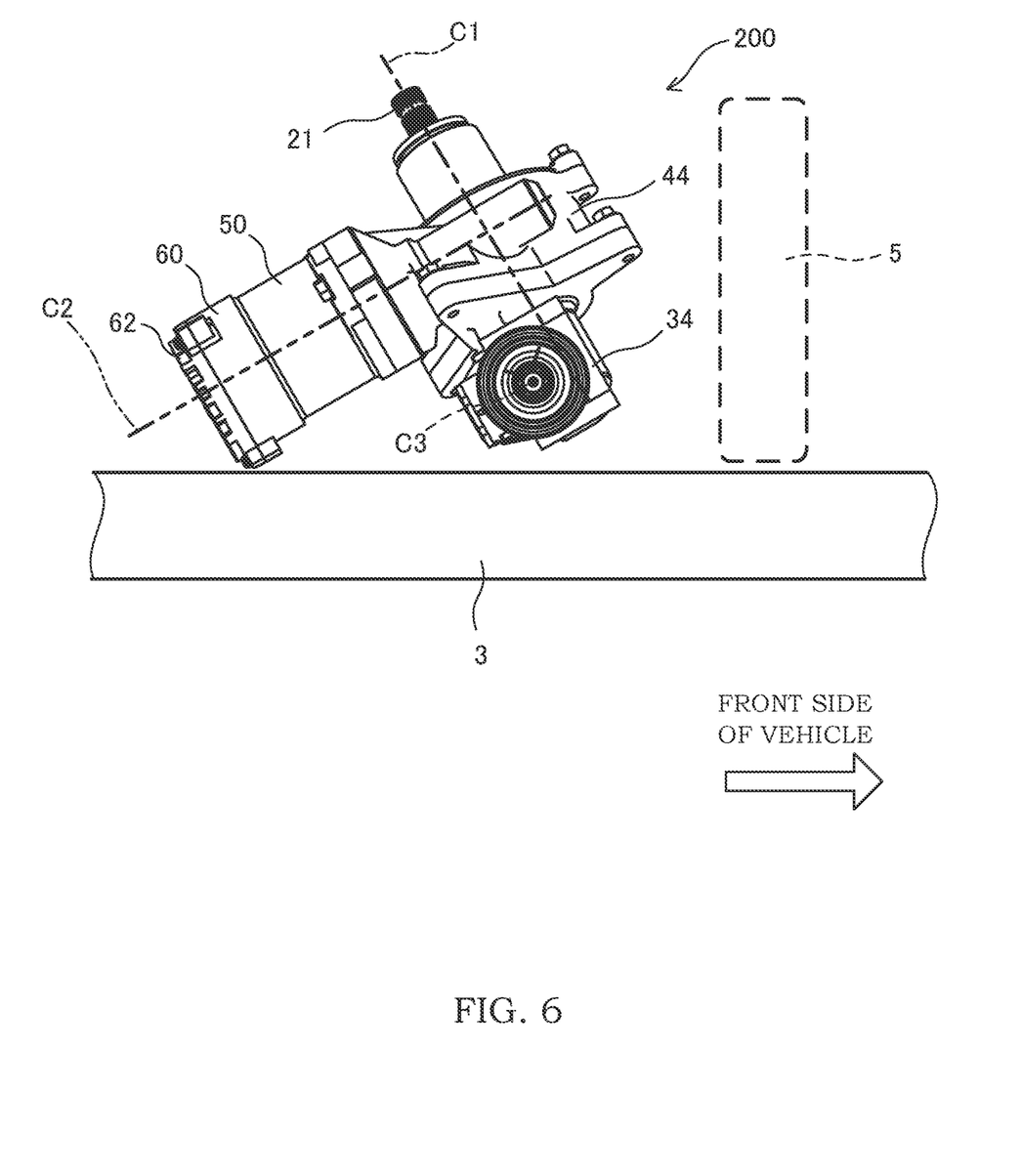
FIG. 6 is a diagram showing a state in which the electric power steering apparatus according to the second embodiment of the present invention is assembled to the vehicle, viewed from the side of vehicle.

Next, an electric power steering apparatus 200 according to a second embodiment of the present invention will be described with reference to FIGS. 6 to 9. In the following, differences from the first embodiment will be mainly described, and components that are the same as those in the first embodiment are assigned the same reference numerals and descriptions thereof will be omitted. FIG. 6 is a diagram of the electric power steering apparatus 200 assembled to the vehicle viewed from the side of the vehicle, and FIG. 7 is a diagram of the electric power steering apparatus 200 viewed from the top of the vehicle.

A basic configuration of the electric power steering apparatus 200 is similar to that of the electric power steering apparatus 100 according to the first embodiment. The electric power steering apparatus 200 differs from the electric power steering apparatus 100 in that the controller 60 is arranged on the opposite side from the radiator 5 such that, in addition to the rack housing 34, the electric motor 50 is also sandwiched between the controller 60 and the radiator 5.

Figure 7:
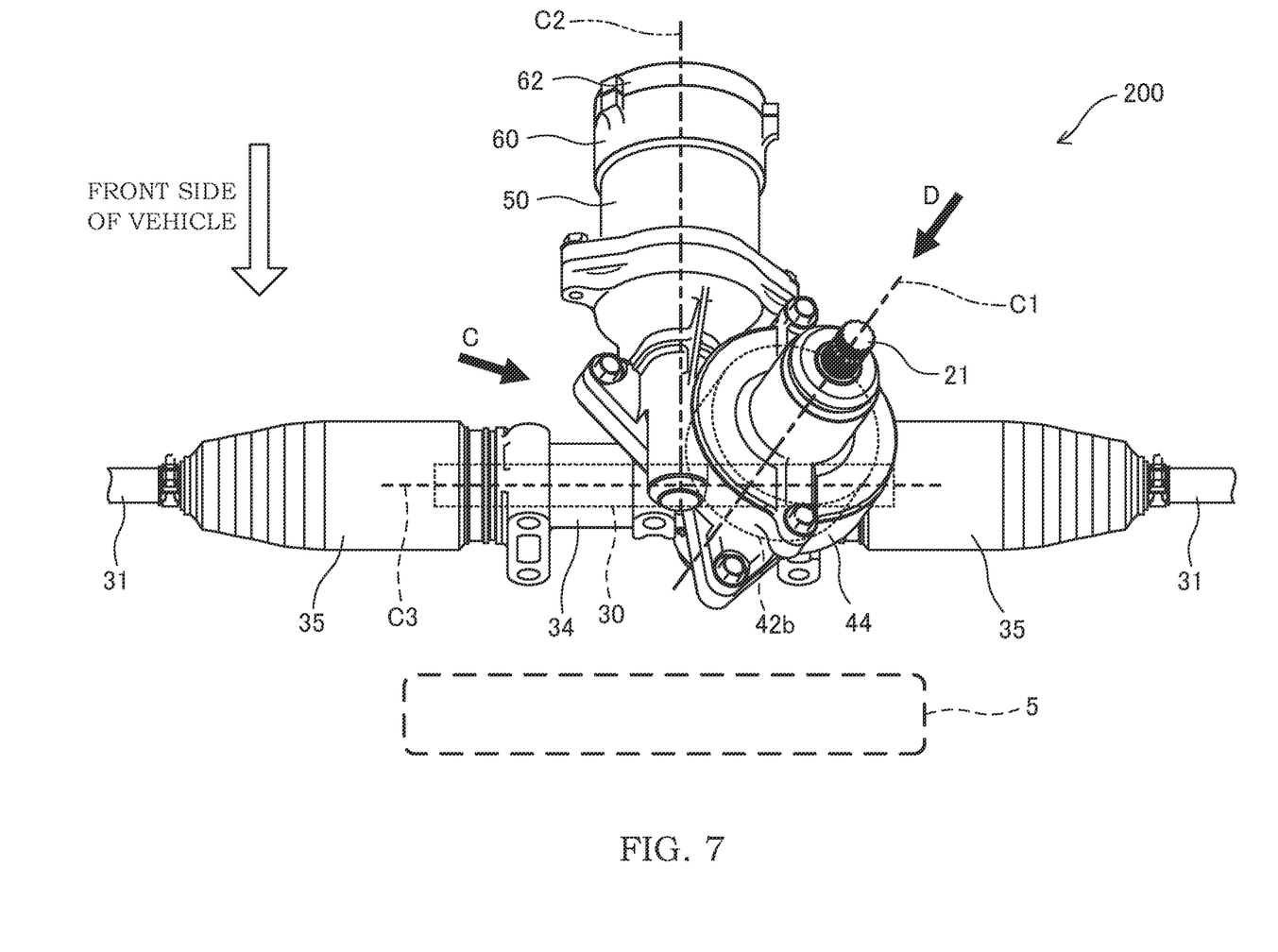
FIG. 7 is a diagram showing a state in which the electric power steering apparatus according to the second embodiment of the present invention is assembled to the vehicle, viewed from the top of vehicle.

In the second embodiment, as shown in FIGS. 6 and 7, even in a case in which the heat source like the radiator 5 is arranged in the vicinity of the electric power steering apparatus 200, the controller 60 is arranged on the opposite side from the radiator 5 serving as the heat source such that the rack housing 34 accommodating the rack shaft 30 and the electric motor 50 are sandwiched between the controller 60 and the radiator 5 so that the temperature of the controller 60 is not increased by the heat released from the radiator 5.

As described above, by arranging the rack housing 34 between the radiator 5 and the controller 60, similarly to the above-described first embodiment, the rack housing 34 functions as the heat shielding member that blocks the hot air from the radiator 5 and the radiator fan such that the hot air does not hit the controller 60 directly. Furthermore, by arranging the electric motor 50 between the radiator 5 and the controller 60, the controller 60 is arranged at the position farther away from the radiator 5 compared with the configuration in the above-described first embodiment. Therefore, the controller 60 is less likely to be heated by the heat released from the radiator 5.

In addition, the heat sink 62 is also arranged on the opposite side from the radiator 5 such that the rack housing 34 and the electric motor 50 are sandwiched between the heat sink 62 and the radiator 5 such that the heat released from the radiator 5 is not transferred to the inside of the controller 60 via the heat sink 62.

Also in this case, the rack housing 34 functions as the heat shielding member that blocks the hot air from the radiator 5 and the radiator fan such that the hot air does not hit the heat sink 62 directly. Furthermore, the heat sink 62 is arranged at the position farther away from the radiator 5 compared with the configuration in the above-described first embodiment. Therefore, the heat sink 62 is less likely to be heated by the heat released from the radiator 5.

As described above, by utilizing the rack housing 34 as the heat shielding member, and at the same time, by arranging the controller 60 and the heat sink 62 at the position farther away from the radiator 5, it is possible to suppress the heating of the controller 60 and the heat sink 62 by the heat released from the radiator 5.

Therefore, even in a case in which the heat source like the radiator 5 is arranged in the vicinity of the electric power steering apparatus 200, the increase in the temperature of the controller 60 by the radiant heat radiated from the heat source is suppressed, and as a result, it is possible to allow the electric power steering apparatus 200 to be operated consistently and stably.

Figure 8:
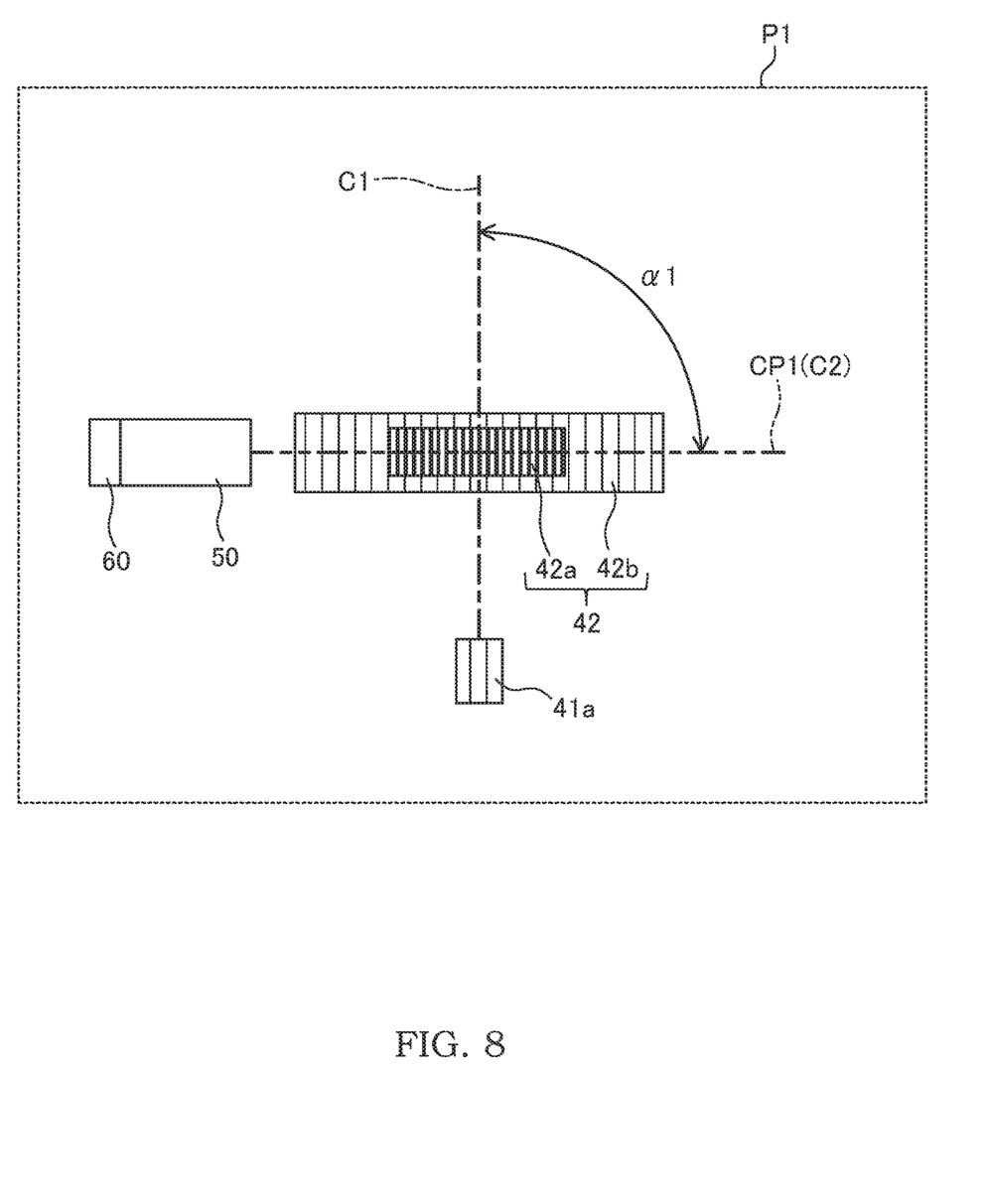
FIG. 8 is a schematic view showing the relationship between the first shaft center and the second shaft center that is projected on the first plane.

Next, a configuration that allows arrangement of the controller 60 and the heat sink 62 on the opposite side from the radiator 5 such that the rack housing 34 and the electric motor 50 are sandwiched between the radiator 5 and the controller 60 and the heat sink 62 will be described with reference to FIGS. 6 to 9. FIG. 8 is a schematic view showing the relationship between the first shaft center C1 and the second shaft center C2 that is projected on the first plane P1 that includes the first shaft center C1 corresponding to the shaft center of the output shaft 22 and that is in parallel with the second shaft center C2 corresponding to the shaft center of the worm shaft 42a, viewed from the direction shown by an arrow C in FIG. 7, and FIG. 9 is a schematic view showing the relationship between the second shaft center C2 and the third shaft center C3 corresponding to the shaft center of the rack shaft 30 that is projected on the second plane P2 that is orthogonal with the first shaft center C1, viewed from the direction shown by an arrow D in FIG. 7.

As shown in FIG. 8, a predetermined first angle a1 is formed between the first shaft center C1 of the output shaft 22 and the first projected-shaft-center CP1 corresponding to the second shaft center C2 of the worm shaft 42a that is projected on the first plane P1.

Because the controller 60 is arranged on the second shaft center C2 together with the electric motor 50, if the first angle a1 is set so as to be smaller than 90 degrees, a state in which the controller 60 is positioned closer to the pinion gear 41a arranged on the first shaft center C1, in other words, a state in which the controller 60 is positioned closer to the rack housing 34 is achieved. On the other hand, if the first angle a1 is set so as to be larger than 90 degrees, a state in which the controller 60 is positioned farther away from the rack housing 34 is achieved. If the first angle a1 is set so as to be equal to 90 degrees, a state in which the output shaft 22 and the worm shaft 42a are positioned so as to be orthogonal with each other is achieved.

Figure 9:
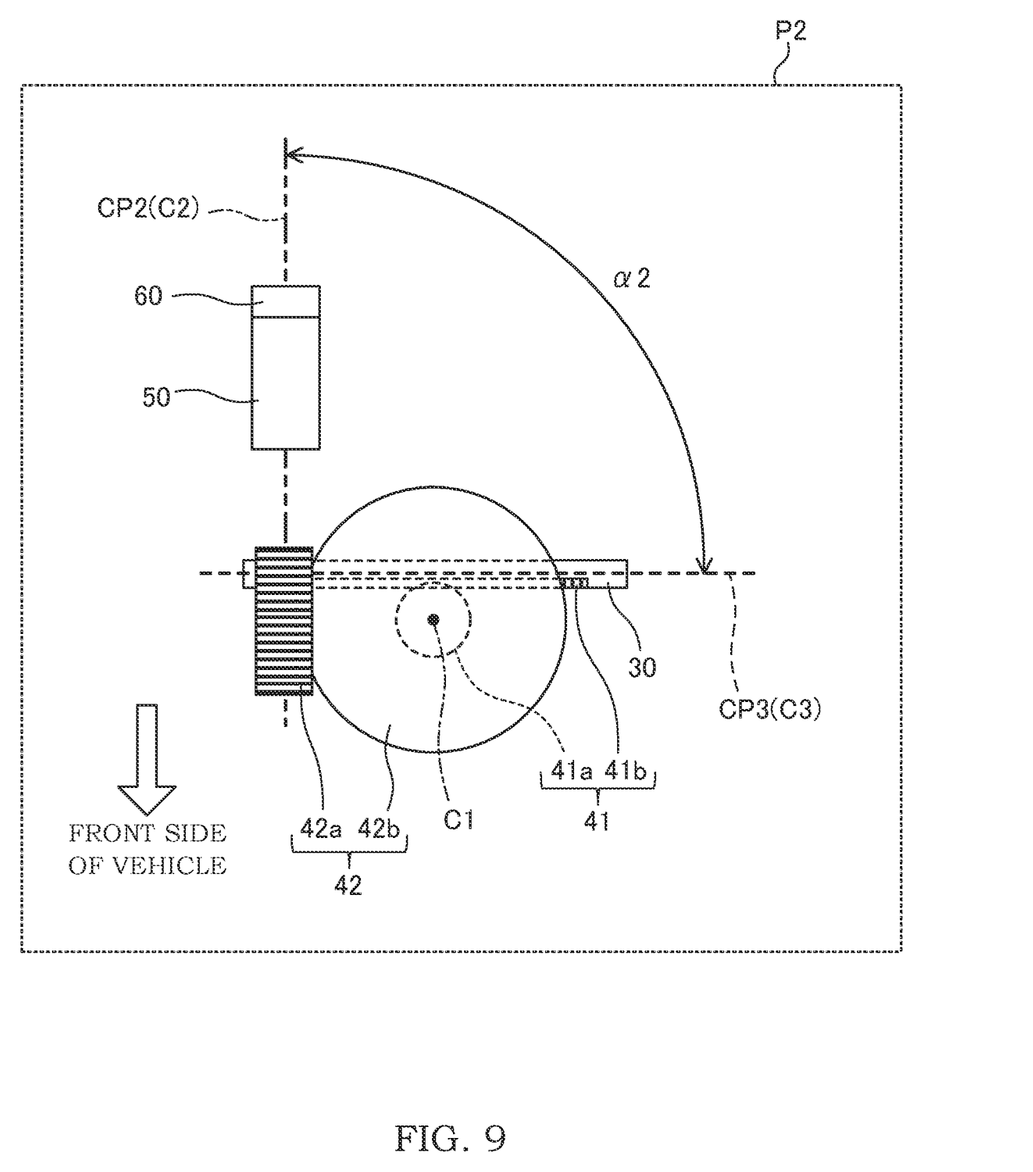
FIG. 9 is a schematic view showing the relationship between the second shaft center and the third shaft center that is projected on the second plane.

In addition, as shown in FIG. 9, a predetermined second angle a2 is formed between the second projected-shaft-center CP2 corresponding to the second shaft center C2 of the worm shaft 42a that is projected on the second plane P2 and the third projected-shaft-center CP3 corresponding to the third shaft center C3 of the rack shaft 30 that is projected on the second plane P2.

Because the controller 60 is arranged on the second shaft center C2, by setting the second angle a2 so as to be equal to 90 degrees, because the electric motor 50 is located between the controller 60 and the rack shaft 30, a state in which the controller 60 is positioned farthest away from the rack shaft 30, in other words, the controller 60 is positioned farthest away from the rack housing 34 is achieved.

On the other hand, if the second angle a2 is set so as to be smaller than 90 degrees or so as to be larger than 90 degrees, a state in which the controller 60 is positioned closer to the rack housing 34 is achieved. If the second angle a2 is set so as to be equal to 0 degree, the second projected-shaft-center CP2 and the third projected-shaft-center CP3 are positioned so as to be parallel with each other.

In the above, in order to achieve the configuration in which the hot air from the radiator 5 does not hit the controller 60 and the heat sink 62 directly, it is preferable that the controller 60 and the heat sink 62 be arranged such that the controller 60 and the heat sink 62 are hidden behind the rack housing 34 as much as possible when viewed from the radiator 5 side, and at the same time, it is preferable that the controller 60 and the heat sink 62 be positioned farther away from the radiator 5.

In order to arrange the controller 60 and the heat sink 62 so as to be positioned farther away from the radiator 5 the radiator 5 while arranging the controller 60 and the heat sink 62 so as to be hidden behind the rack housing 34 when viewed from the radiator 5 side as described above, the controller 60 and the heat sink 62 are arranged on the opposite side from the radiator 5 such that the rack housing 34 and the electric motor 50 are sandwiched between the radiator 5 and the controller 60 and the heat sink 62 by setting the second angle a2 so as to be equal to 90 degrees or so as to be close to 90 degrees and by setting the first angle a1 so as to be about 90 degrees.

If the first angle a1 is set so as to have a too small value, the controller 60 is arranged at a position lower than the rack housing 34 in the vertical direction, and therefore, depending on the position of the radiator 5, there is a risk in that the hot air from the radiator 5 may hit the controller 60 directly. Therefore, the size of the first angle a1 is set appropriately in accordance with the positional relationship between the radiator 5 and the rack housing 34.

As described above, the sizes of the first angle a1 and the second angle a2, in other words, by setting the positional relationship between the output shaft 22, the worm shaft 42a, and the rack shaft 30 in accordance with the positional relationship between the radiator 5 and the rack housing 34, it is possible to block the hot air flowing from the radiator 5 towards the controller 60 and the heat sink 62 by the rack housing 34. Therefore, it is possible to suppress the increase in the temperature of the controller 60.

Especially, as shown in FIGS. 6 and 7, it is possible to achieve the configuration in which the controller 60 and the heat sink 62 are not affected by the heat released from the radiator 5 by setting the sizes of the first angle a1 and the second angle a2 such that the rack housing 34 and the electric motor 50 are arranged between the radiator 5 and the controller 60 and the heat sink 62, and thus, the controller 60 and the heat sink 62 are arranged at the position relatively farther away from the radiator 5.

The first angle a1 is not limited to the angle at the position shown in FIG. 8, and the angle may be any of other angles at other positions as long as they are angles formed between the first shaft center C1 and the first projected-shaft-center CP1 on the first plane P1. Similarly, the second angle a2 is not limited to the angle at the position shown in FIG. 9, and the angle may be any of other angles at other positions as long as they are angles formed between the second projected-shaft-center CP2 and the third projected-shaft-center CP3 on the second plane P2.

According to the above-described second embodiment, the following effects are afforded.

In the electric power steering apparatus 200, the controller 60 is arranged on the opposite side from the radiator 5 serving as the heat source such that, in addition to the rack housing 34 accommodating the rack shaft 30, the electric motor 50 is also sandwiched between the controller 60 and the radiator 5. As described above, by utilizing the rack housing 34 as the heat shielding member, and at the same time, by arranging the controller 60 at the position relatively farther away from the radiator 5, it is possible to suppress the heating of the controller 60 and the heat sink 62 by the heat released from the radiator 5. Therefore, even in a case in which the heat source like the radiator 5 is arranged in the vicinity of the electric power steering apparatus 200, the increase in the temperature of the controller 60 by the radiant heat radiated from the heat source is suppressed, and as a result, it is possible to allow the electric power steering apparatus 200 to be operated consistently and stably.

Next, modifications of each of the embodiments described above will be explained. The modifications shown below also fall within the scope of the present invention, and it is also possible to combine the configurations shown in the modifications with the configurations described in the above embodiments, or to combine the configurations described in the following different modifications.

In each of the embodiments described above, the worm housing 44 is arranged on the upper side of the rack housing 34 in the vertical direction. Instead of such a configuration, the worm housing 44 may be arranged on the lower side of the rack housing 34 in the vertical direction. With such a configuration, it is possible to effectively utilize a space below the rack housing 34 in the vertical direction. Even in this case, by appropriately setting the sizes of the first angle a1 and the second angle a2, it is possible to arrange the controller 60 and the heat sink 62 on the opposite side from the radiator 5 such that the rack housing 34 is sandwiched between the radiator 5 and the controller 60 and the heat sink 62.

In addition, in each of the embodiments described above, the controller 60 is provided on the opposite side from the worm shaft 42a such that the electric motor 50 is sandwiched between the controller 60 and the worm shaft 42a. Instead of such a configuration, as long as the controller 60 is arranged in the vicinity of the electric motor 50, the controller 60 may be arranged between the electric motor 50 and the worm shaft 42a, or the controller 60 may be assembled onto an outer circumferential surface of the electric motor 50.

In addition, in each of the embodiments described above, the heat sink 62 is provided on the opposite side from the electric motor 50 such that the controller 60 is sandwiched between the heat sink 62 and the electric motor 50. Instead of such a configuration, as long as the heat generated in the elements in the controller 60 can be released to the outside, the heat sink 62 may be provided in any way with respect to the controller 60, and for example, the heat sink 62 may be provided on an outer circumferential surface of the controller 60 and formed so as to project radially outward.

In addition, in each of the embodiments described above, a description has been given of a case in which the heat source is the radiator 5; however, the heat source is not limited to the radiator 5, and the heat source may also be an engine main body and an exhaust pipe through which exhaust gas discharged from the engine flows. In addition, in each of the embodiments described above, a description has been given of a case in which the heat source is arranged on the front side of the electric power steering apparatus 100, 200; however, the heat source may be arranged on the rear side, the upper side, and the lower side of the electric power steering apparatus 100, 200. When the heat source is arranged on the upper side of the electric power steering apparatus 100, 200, it is preferable that the worm housing 44 be arranged on the lower side of the rack housing 34 in the vertical direction so that the controller 60 and the electric motor 50 are positioned farther away from the heat source.

In addition, in each of the embodiments described above, a steering handle is the steering wheel 10. Instead of such a configuration, the steering handle may be of other forms such as a bar handle, a control stick, and so forth, for example.

The configurations, operations, and effects of the embodiments of the present invention will be collectively described below.

The electric power steering apparatus 100, 200 arranged in the vicinity of the radiator 5 mounted on the vehicle includes: the rack shaft 30 configured to turn the road wheels 1; the output shaft 22 serving as the pinion shaft provided with the pinion gear 41a configured to be engaged with the rack gear 41b of the rack shaft 30; the worm wheel 42b provided on the output shaft 22; the worm shaft 42a configured to be engaged with the worm wheel 42b; the electric motor 50 configured to rotationally drive the worm shaft 42a; and the controller 60 configured to control the driving of the electric motor 50, wherein at least the part of the controller 60 is arranged on the opposite side from the radiator 5 such that the rack housing 34 is sandwiched between at least the part of the controller 60 and the radiator 5, the rack housing 34 being configured to accommodate the rack shaft 30.

In this configuration, at least the part of the controller 60 is arranged on the opposite side from the radiator 5 serving as the heat source such that the rack housing 34 accommodating the rack shaft 30 is sandwiched between at least the part of the controller 60 and the radiator 5. As described above, by utilizing the rack housing 34 as the heat shielding member, it is possible to suppress the heating of the controller 60 and the heat sink 62 by the heat released from the radiator 5. Therefore, even in a case in which the heat source like the radiator 5 is arranged in the vicinity of the electric power steering apparatus 100, 200, the increase in the temperature of the controller 60 by the radiant heat radiated from the heat source is suppressed, and as a result, it is possible to allow the electric power steering apparatus 100, 200 to be operated consistently and stably.

In addition, in this configuration, because the rack housing 34 is utilized as the heat shielding member, there is no need to separately provide the electric power steering apparatus 100, 200 with the member for suppressing the flow of the hot air from the radiator 5 directly hitting the controller 60 and the heat sink 62. Thus, it is possible to suppress the increase in the temperature of the controller 60 without increasing a production cost for the electric power steering apparatus 100, 200.

In addition, the controller 60 has the heat sink 62 configured to release the heat from the controller 60, and the controller 60 is arranged such that at least the part of the heat sink 62 is positioned on the opposite side from the radiator 5 such that the rack housing 34 is sandwiched between at least the part of the heat sink 62 and the radiator 5.

In this configuration, the controller 60 is arranged such that at least the part of the heat sink 62 is positioned on the opposite side from the radiator 5 such that the rack housing 34 is sandwiched between at least the part of the heat sink 62 and the radiator 5. Therefore, the transfer of the heat released from the radiator 5 to the inside of the controller 60 via the heat sink 62 causing the increase in the temperature of the controller 60 is suppressed. Therefore, even in a case in which the heat source like the radiator 5 is arranged in the vicinity of the electric power steering apparatus 100, 200, the increase in the temperature of the controller 60 by the radiant heat radiated from the heat source is suppressed, and as a result, it is possible to allow the electric power steering apparatus 100, 200 to be operated consistently and stably.

In addition, at least the part of the controller 60 is arranged on the opposite side from the radiator 5 such that, in addition to the rack housing 34, the electric motor 50 is sandwiched between at least the part of the controller 60 and the radiator 5.

In this configuration, at least the part of the controller 60 is arranged on the opposite side from the radiator 5 such that, in addition to the rack housing 34, the electric motor 50 is also sandwiched between at least the part of the controller 60 and the radiator 5. As described above, by arranging the electric motor 50, in addition to the rack housing 34, between the controller 60 and the radiator 5, it is possible to utilize the rack housing 34 as the heat shielding member and to arrange the controller 60 at the position relatively farther away from the radiator 5. Therefore, even in a case in which the heat source like the radiator 5 is arranged in the vicinity of the electric power steering apparatus 200, the increase in the temperature of the controller 60 by the radiant heat radiated from the heat source is suppressed, and as a result, it is possible to allow the electric power steering apparatus 200 to be operated consistently and stably.

In addition, the controller 60 is arranged so as to be adjacent to the electric motor 50; the first angle a1 is set as an angle formed between the first shaft center C1 and the first projected-shaft-center CP1, the first projected-shaft-center CP1 corresponding to the second shaft center C2 projected on the first plane P1, the first plane P1 including the first shaft center C1 and being in parallel with the second shaft center C2, the first shaft center C1 corresponding to the shaft center of the output shaft 22, and the second shaft center C2 corresponding to the shaft center of the worm shaft 42a; and the second angle a2 is set as an angle formed between the second projected-shaft-center CP2 and the third projected-shaft-center CP3, the second projected-shaft-center CP2 corresponding to the second shaft center C2 projected on the second plane P2, the second plane P2 being orthogonal with the first shaft center C1, the third projected-shaft-center CP3 corresponding to the third shaft center C3 projected on the second plane P2, and the third shaft center C3 corresponding to the shaft center of the rack shaft 30, and wherein the sizes of the first angle a1 and the second angle a2 are set such that at least the part of the controller 60 is arranged on the opposite side from the radiator 5 such that the rack housing 34 is sandwiched between at least the part of the controller 60 and the radiator 5.

In this configuration, it is possible to appropriately change the position of the controller 60 relative to the rack housing 34 by changing the sizes of the first angle a1 and the second angle a2. Therefore, regardless of the positional relationship between the radiator 5 and the rack housing 34, it is possible to arrange at least the part of the controller 60 on the opposite side from the radiator 5 such that the rack housing 34 is sandwiched between at least the part of the controller 60 and the radiator 5 by changing the sizes of the first angle a1 and the second angle a2. Therefore, regardless of the position of the heat source like the radiator 5 relative to the electric power steering apparatus 100, 200, the increase in the temperature of the controller 60 by the radiant heat radiated from the heat source is suppressed, and as a result, it is possible to allow the electric power steering apparatus 100, 200 to be operated consistently and stably.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2019-4519 filed with the Japan Patent Office on Jan. 15, 2019, the entire contents of which are incorporated into this specification by reference.

The invention claimed is:

1. An electric power steering apparatus arranged in a vicinity of a heat source mounted on a vehicle, the electric power steering apparatus comprising:
    a rack shaft configured to turn a road wheel;
    a rack housing accommodating the rack shaft and being disposed with the heat source arranged at a side thereof;
    a pinion shaft provided with a pinion gear configured to be engaged with a rack gear of the rack shaft;
    a worm wheel provided on the pinion shaft;
    a worm shaft configured to be engaged with the worm wheel;
    an electric motor configured to rotationally drive the worm shaft; and
    a control unit configured to control driving of the electric motor, wherein
    the control unit is arranged so as to be adjacent to the electric motor,
    a first angle is set as an angle formed between a first shaft center and a first projected-shaft-center, the first projected-shaft-center corresponding to a second shaft center projected on a first plane, the first plane including the first shaft center and being in parallel with the second shaft center, the first shaft center corresponding to a shaft center of the pinion shaft, and the second shaft center corresponding to a shaft center of the worm shaft,
    a second angle is set as an angle formed between a second projected-shaft-center and a third projected-shaft-center, the second projected-shaft-center corresponding to the second shaft center projected on a second plane, the second plane being orthogonal to the first shaft center, the third projected-shaft-center corresponding to a third shaft center projected on the second plane, and the third shaft center corresponding to a shaft center of the rack shaft, and
    at least a part of the control unit is arranged at a side of the rack housing opposite to the side of the rack housing at which the heat source is arranged, and the first angle and the second angle are set such that the rack housing is sandwiched between the heat source and at least the part of the control unit.

2. The electric power steering apparatus according to claim 1, wherein
    the control unit has a heat sink configured to release heat from the control unit, and
    the control unit is arranged such that at least a part of the heat sink is positioned at the side of the rack housing opposite to the side of the rack housing at which the heat source is arranged such that the rack housing is sandwiched between at least the part of the heat sink and the heat source.

3. The electric power steering apparatus according to claim 1, wherein
    the electric motor is disposed with the heat source arranged at a side thereof, and at least the part of the control unit is arranged at a side of the electric motor opposite to the side of the electric motor at which the heat source is arranged such that, in addition to the rack housing, the electric motor is also sandwiched between the heat source and at least the part of the control unit.

* * * * *